UNITED STATES PATENT OFFICE.

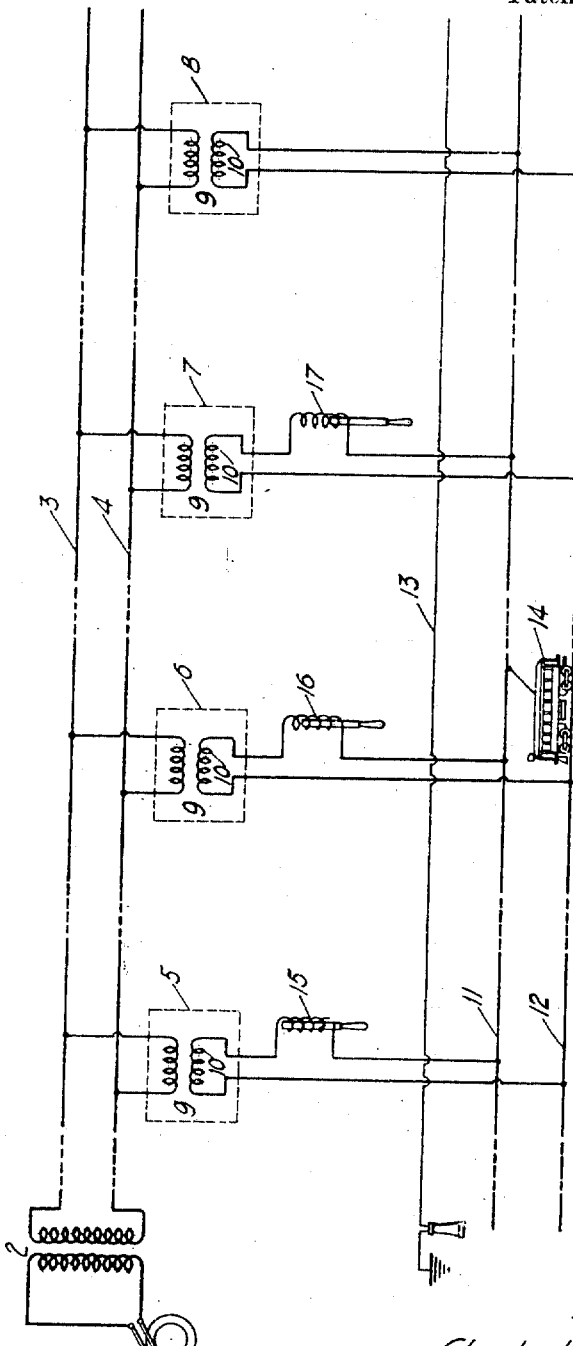

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRIC DISTRIBUTING SYSTEM.

1,227,772.   Specification of Letters Patent.   Patented May 29, 1917.

Application filed May 6, 1915. Serial No. 26,434.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Electrical Distributing Systems, of which the following is a specification.

My invention relates to electrical distributing systems, and it has special reference to means for minimizing inductive disturbances in electrical circuits that may be caused by other circuits which are located in proximity thereto.

More particularly, my invention is applicable to the protection of telephone, telegraph and other circuits utilized for the transmission of intelligence, which are very susceptible to slight inductive disturbances and are paralleled for longer or shorter distances by circuits utilized for the transmission of power by alternating currents.

When telephone, telegraph and like circuits are in proximity to circuits carrying alternating currents, such as alternating current railway systems, the electromotive forces induced in the intelligence transmission circuits disturb and frequently preclude their successful operation. Consider, for example, an alternating current railway system in which a trolley wire constitutes one of the supply conductors for a moving load, and the track rails, either alone or in conjunction with the ground, constitute the other supply conductor. When a moving vehicle receives power from the trolley conductor, a primary circuit comprising a single convolution of varying length is formed which may induce alternating electromotive forces in a secondary circuit, as for example, a telephone or telegraph circuit that is located partially or wholly in proximity thereto.

The disturbing electromotive forces induced in a secondary circuit of the aforementioned character, depend upon the distance between the intelligence transmission system or secondary circuit, and the railway system or primary circuit, the amount, the rate of variation, and the direction of the current flowing in the primary system. If a continuous trolley is employed and receives current from several sub-stations, a moving car or locomotive will receive current not only from the sub-stations immediately adjacent thereto, but also from sub-stations remote therefrom. In railway systems heretofore installed, those sub-stations which are intermediate the point of load supply and the main power station, will supply greater amounts of current to the load point than those substations on the far side of the load point. This unequal current supply is a result of the impedance offered by the feeder system to the flow of the load currents, the impedance of the feeders increasing as the substations are removed from the main power station. When unequal currents flow over the trolley conductor in opposite directions to the point of load supply, the electromotive forces induced in the adjacent secondary or telephone circuit will be unbalanced, inasmuch as the ampere-miles on the side of the load adjacent to the main power house will be substantially greater than the ampere-miles on the side of the load remote from the power house.

An object of my invention, therefore, is to minimize inductive disturbances in a secondary, or telephone circuit by substantially precluding the flow therein of unbalanced induced currents which may result from a moving load upon the primary or railway circuit which is supplied with power from a plurality of substations that are removed longer or shorter distances from the main power house.

It is essential on very long and heavily loaded railway systems to so dispose the substations that the power currents flowing therefrom will assist in minimizing the resultant voltages induced in a telephone or telegraph circuit paralleling the system. If it were possible to construct a transmission line or feeder system and the electrical apparatus employed in substations with zero impedance, the voltage induced in a telephone circuit paralleling the railway system would be zero, because under these circumstances the two sub-stations immediately adjacent to the point of load supply would contribute all of the required load current. Moreover, the current supplied from each of the said substations would be inversely proportional to the impedance of the trolley wire extending from each of said substations up to the load point. As a result, the total ampere-miles in the section of the system between the two active substations would be zero because of the oppositely directed flow of the load currents from the two active substations. Consequently, the resultant electromotive forces induced in the adjacent telephone circuit would be zero, since none of the other substations connected to the system would contribute any portion of the load currents.

Because the above-mentioned conditions cannot be realized in any railway installation, I have invented the system described herein and illustrated in the single figure of the accompanying drawing.

An alternating current generator 1, which, for simplicity, is represented as a single phase generator, supplies power through a step-up transformer 2 to a feeder circuit comprising high-tension conductors 3 and 4. It will be understood that the railway system is sufficiently long to necessitate the use of a plurality of spaced substations such as represented at 5—6—7 and 8. Each of the above-mentioned substations comprises a step-down transformer 9, the low-tension winding 10 of which supplies power to a trolley conductor 11 and a track 12. Inasmuch as the track 12 is grounded, it may be advisable, under certain circumstances, to ground those terminals of the low-tension windings 10 which are shown in the drawing as being connected to the track 12. Located in inductive proximity to the trolley conductor 11 is a conductor 13 of an intelligence transmission system, such, for example, as a telephone system. Ordinarily, when a moving vehicle, 14 traverses the railway system, a very large portion of the current supplied to the load 14 will come from the sub-stations 5 and 6 which are interposed intermediate the point of load supply and the source of power supply 1. The sub-stations 7 and 8, however, will also supply current to the load 14, but, because of the greater impedance of the circuit intervening between the power houses 7 and 8 and the source of supply 1, the substations 7 and 8 will not contribute their share of the load. As a result, the electromotive forces induced in the adjacent telephone circuit 13 by reason of the oppositely directed and unequal current flow over the trolley 11, will be unbalanced and the disturbances resulting therefrom may interfere with the successful operation of the telephone circuit.

To overcome the above-mentioned difficulty, I have deliberately inserted reactance elements in the supply or feeder circuit in order to compensate for the increase of impedance of the supply system as the distance from the source of power supply 1 increases. To this end, I have inserted a reactance element between the secondary windings 10 of the transformers 9 and the trolley conductor 11. A reactance element 15 is inserted in circuit with the secondary winding of the transformer 9 of the power house 5, a reactance element 16 is inserted in circuit with the secondary winding of the transformer 9 of the power house 6, and a reactance element 17 is inserted in circuit with the secondary winding of the transformer 9 of the power house 7. The transformer 9 of the sub-station 8 at the end of the line is directly connected to the railway circuit without the use of a reactance element.

Each of the reactance elements 15, 16 and 17 are so adjusted that the impedances inserted in the secondary circuits of the transformers 9 progressively decrease as their distances from the power house increase, the artificial impedance becoming substantially zero at the sub-station 8 at the end of the line. With a proper proportioning of these reactance elements, it is possible to obtain proper compensation for the extreme load condition upon the railway system, and to obtain only small resultant positive and negative induced voltages on the telephone circuit 13, when the loads are at the end of the railway system and near the power house, respectively. If, in addition, the transformers 9 are so designed as to have extremely low internal reactance, a further reduction in inductive disturbances upon the telephone circuit 13 may be obtained without substantially increasing the risk of danger accruing to the sub-station transformers 9 under short circuit conditions.

In accordance with the above method for compensating for the unequal reactances of the supply or feeder circuit comprising the conductors 3 and 4, the inductive disturbances impressed upon the telephone circuit 13, which is adjacent to the railway system, are greatly minimized, because the ampere-miles on both sides of a load point are substantially equal to each other and effect neutralization of the induced electromotive forces in the telephone circuit because of the oppositely directed current flow in the trolley conductor 11.

I claim as my invention:

1. The combination with a source of current supply, transmission line conductors connected thereto, a common power supply circuit, and spaced transformers having their primary windings connected to said transmission line and their secondary windings connected at spaced intervals to the common power supply circuit, of reactance elements connected in circuit with said transformers, the reactance offered by said reactance elements progressively decreasing in amount as their distance from the source of current supply increases.

2. The combination with a source of current supply, transmission line conductors connected thereto, a common power supply circuit, and spaced transformers having their primary windings connected to said transmission line and their secondary windings connected at spaced intervals to the common power supply circuit, of reactance elements connected in circuit with said transformers, the reactance elements being so adjusted that the ampere-miles on both sides of a load point on said common power supply circuit are substantially equal in value.

3. The combination with a source of current supply and feeders connected thereto, of a power supply system, transformers for connecting at spaced intervals said power supply system to said feeders, and reactance elements connected in circuit with said transformers, said reactance elements being so adjusted that the reactance offered thereby progressively varies in amount as their distance from the source of current supply varies.

4. The combination with a source of current supply and feeders connected thereto, of a power supply system, transformers for connecting at spaced intervals said power supply system to said feeders, and reactance elements connected in circuit with said transformers, the reactance elements being so adjusted that the ampere-miles on both sides of a moving load point on said power supply system are substantially equal in value.

5. The combination with a source of current supply and feeders connected thereto, of a railway system comprising a trolley conductor, transformers for connecting at spaced intervals said trolley conductor to said feeders, and reactance elements connected in circuit with said transformers to offer impedance to the currents supplied to said trolley, said reactance elements being so adjusted that the reactance offered thereby progressively varies in amount as the distance from the source of current supply varies.

6. The combination with a source of current supply and feeders connected thereto, of a railway system comprising a trolley conductor, transformers for connecting at spaced intervals said trolley conductor to said feeders, and reactance elements connected in circuit with said transformers to offer impedance to the currents supplied to said trolley, the reactance elements being so adjusted that the ampere-miles on both sides of a power consuming vehicle moving on the railway system are substantially equal in value.

In testimony whereof, I have hereunto subscribed my name this 29th day of April 1915.

CHARLES LE G. FORTESCUE.